June 30, 1942.  N. R. COLLINS ET AL  2,287,975
LIQUID TREATMENT APPARATUS
Filed Dec. 9, 1939
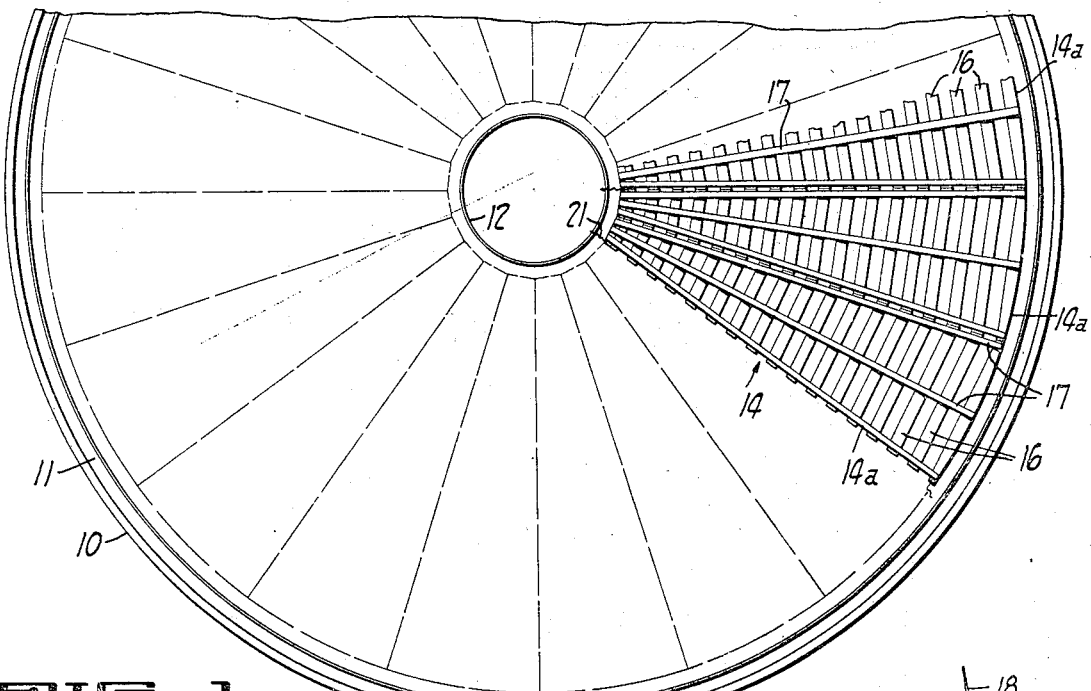
FIG_1_
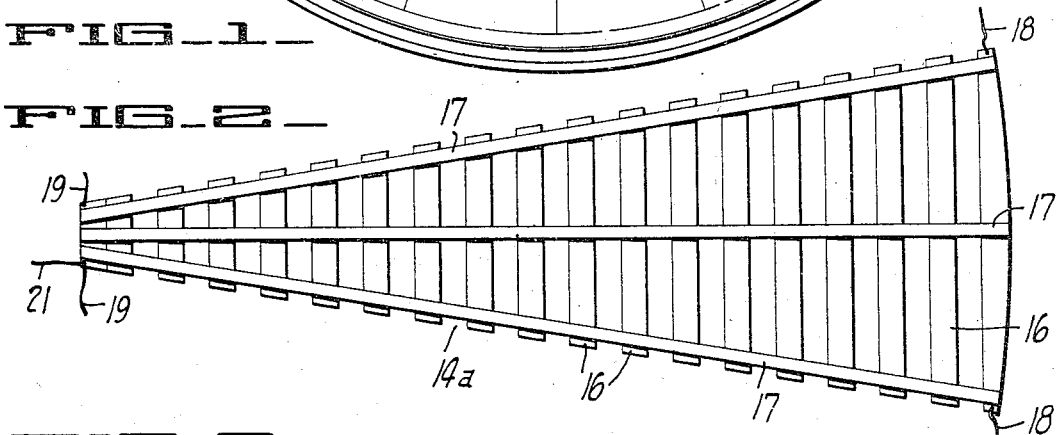
FIG_2_
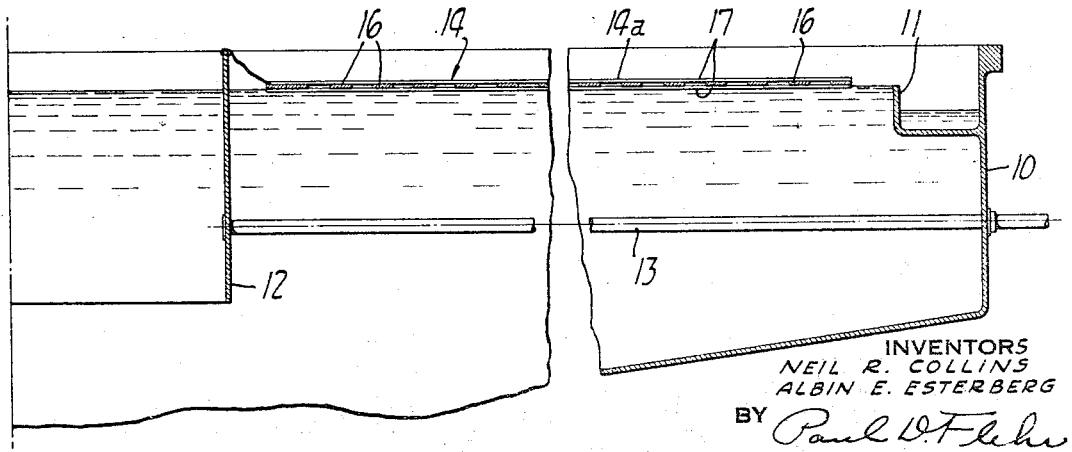
FIG_3_
INVENTORS
NEIL R. COLLINS
ALBIN E. ESTERBERG
BY
ATTORNEY Patented June 30, 1942

2,287,975

UNITED STATES PATENT OFFICE 2,287,975

LIQUID TREATMENT APPARATUS

Neil R. Collins, San Francisco, and Albin E. Esterberg, Menlo Park, Calif., assignors to Marine Magnesium Products Corporation, a corporation of Delaware Application December 9, 1939, Serial No. 308,416

5 Claims. (Cl. 210—55)

This invention relates generally to apparatus making use of comparatively large tanks or reservoirs for the treatment of various liquids or pulps. More particularly, it relates to apparatus such as gravity settlers, clarifiers, thickeners, or classifiers, where it is important to maintain the body of liquid undergoing treatment relatively quiescent.

When apparatus of the above character is installed in locations exposed to wind, it is frequently necessary to construct a relatively expensive cover over the entire tank in order to avoid objectionable wave action. Wave action seriously interferes with operation of equipment such as settlers, thickeners, clarifiers or classifiers, since it will cause agitation extending down into the body of the liquid undergoing treatment. For example with a clarifier having a side overflow launder, wave action tends to prevent proper settling of solids whereby solids which would ordinarily settle out and be withdrawn in the underflow, pass out with the overflow. As the size of the tank is increased, the extent of the wave action and the seriousness of its effect upon operation of the equipment is intensified. Also, as the size of the tank is increased, the cost of placing a cover over the entire tank is greatly increased.

It is an object of the present invention to solve this difficulty in a simple and effective manner without the use of a conventional tank cover. Briefly, this is accomplished by a novel form of floating cover which rests directly upon the surface of the liquid.

Further objects of the invention will appear from the following description in which the preferred embodiment has been set forth in detail in conjunction with the accompanying drawing.

Referring to the drawing—

Figure 1 is a plan view showing a clarifier tank equipped in accordance with the present invention;

Figure 2 is a detail illustrating one of the grill-like segments for forming the floating cover; and Figure 3 is a side elevational detail, in cross section, showing diagrammatically the manner in which the invention is applied to a clarifier tank having a side overflow launder.

The apparatus shown in Figure 1 consists of a circularly contoured tank 10 having an overflow launder 11 extending entirely about its periphery. At the center of this tank there is a well 12 in which the liquid feed is introduced, and from which liquid spreads out into the main tank. The arrangement is illustrated diagrammatically in Figure 3, in which pipe 13 is indicated for introducing the liquid feed into the well 12.

Assuming that this apparatus is being used to settle out solids from water, the main body of the liquid should remain relatively quiescent in order to afford a clear overflow into the launder 11. Waves produced by wind blowing upon the surface of the liquid cause an unequal spill-over of water into the launder 11 at different points about the periphery of the tank, and in addition the action of such waves extends down into the body of the liquid to cause agitation tending to prevent normal settlement of solids from the liquid.

The floating cover which we employ is designated generally at 14, and rests directly upon the body of liquid in the main tank. Although the details of construction may vary, we have found it convenient to construct this cover in a plurality of sections 14a which are each segmental in contour, as shown in Figure 2. Each segment in this instance is formed of spaced wooden slats 16 connected by the radially extending stringers 17. Wood is a simple and inexpensive material for the construction of these sections, and it affords sufficient buoyancy for floating the cover directly upon the liquid.

The various sections are connected together by means of ropes, wires, chains, or the like, so that each section may remove a limited amount in a vertical direction with respect to its adjacent section. Thus, as is indicated in Figure 2, tie ropes 18 connect the sections at their outer corners, and similar tie ropes 19 connect the inner corners. In addition, tie ropes 21 connect at different points at the inner ends of the sections and serve to anchor the sections to prevent rubbing against either the well 12 or the overflow launder 11.

The size of the slats used in conjunction with the cover sections are proportioned in accordance with the size of the cover required. For example with a settling tank measuring about ninety feet in diameter, the sections range about thirty-two feet long, and were made of one by twelve inch boards spaced about twelve inches apart with the stringers 17 being one by six inch boards. The equipment in this instance was used for the clarification of sea water which had previously been treated with lime, for precipitation of calcium bicarbonate. Without the floating cover, wind would frequently make it necessary to suspend operation of the apparatus, due to lack of proper settlement with resultant cloudy overflow.

With a floating cover as described, the tank can be operated continuously, irrespective of wind conditions, and with the overflow clear at all times.

We claim:

1. In liquid treatment apparatus, a tank for holding a body of liquid undergoing treatment, said tank being provided with means for introducing liquid material into the same and means for removing treated liquid from the tank, and a cover floating upon the surface of the liquid and serving as means to suppress wave action due to wind, said cover comprising a plurality of sections and means for loosely connecting said sections together for relative movement with respect to each other.

2. In liquid treatment apparatus, a tank for holding a body of liquid undergoing treatment with the surface of the liquid directly exposed to wind, said tank being provided with means for introducing liquid material into the same and means for removing treated liquid from the tank, and a cover floating upon the surface of the liquid and serving to suppress wave action, said cover comprising a plurality of foraminous sections, and means for connecting said sections together for limited vertical movement with respect to each other.

3. In liquid treatment apparatus, a tank for holding a body of liquid undergoing treatment with the surface of the liquid directly exposed to wind, said tank being provided with means for introducing liquid material into the same and means for removing treated liquids from the tank, and means extending over the major area of the liquid surface and serving to suppress wave action, said means comprising a plurality of foraminous sections formed of spaced slats, and means connecting the sections together for limited vertical movement with respect to each other.

4. In liquid treatment apparatus, a circularly contoured tank for holding a body of liquid undergoing treatment, the tank being provided with means for introducing liquid to be treated into the tank and a peripheral overflow launder for removing treated material, and a cover floating upon the surface of the liquid within the tank, said cover serving as means to suppress wave action and comprising a plurality of segments and means for connecting said segments together for relative movement in a vertical direction, said cover extending over substantially the entire body of liquid and terminating in spaced proximity to the launder.

5. In liquid treatment apparatus, a circularly contoured tank for holding a body of liquid undergoing treatment, the tank being provided with means for introducing liquid to be treated into the tank, an overflow launder near its outer periphery for removing treated material, the surface of the liquid within the tank being directly exposed to wind, and a cover floating upon the surface of the liquid within the tank and serving as means to suppress wave action, said cover comprising a plurality of buoyant segmental and foraminous sections formed of spaced slats, together with means for retaining said slats in spaced relation, means connecting adjacent edges of said sections together, whereby said sections are permitted limited vertical movement relative to each other, and means for retaining the outer periphery of said cover in spaced proximity with the launder.

NEIL R. COLLINS.
ALBIN E. ESTERBERG.